July 19, 1955 R. M. STIKELEATHER 2,713,375

FIN STRAIGHTENING DEVICES

Filed Oct. 12, 1950 7 Sheets-Sheet 1

INVENTOR.
Robert M. Stikeleather
BY Herman Seid

July 19, 1955 R. M. STIKELEATHER 2,713,375

FIN STRAIGHTENING DEVICES

Filed Oct. 12, 1950 7 Sheets-Sheet 2

INVENTOR.

Robert M. Stikeleather

BY Herman Reid

INVENTOR.
Robert M. Stikeleather
BY Herman Reid

FIN STRAIGHTENING DEVICES

INVENTOR.

BY Robert M. Stikeleather

Herman Rios

INVENTOR.
Robert M. Stikeleather

BY Herm Rui

Robert M. Stikeleather
by Henry Reid

July 19, 1955 R. M. STIKELEATHER 2,713,375

FIN STRAIGHTENING DEVICES

Filed Oct. 12, 1950 7 Sheets-Sheet 7

INVENTOR
Robert M. Stikeleather
BY [signature]
ATT'Y.

United States Patent Office 2,713,375

Patented July 19, 1955

2,713,375

FIN STRAIGHTENING DEVICES

Robert M. Stikeleather, Holbrook, Mass., assignor to Aerofin Corporation, Syracuse, N. Y., a corporation of New Jersey Application October 12, 1950, Serial No. 189,854

7 Claims. (Cl. 153—32)

This invention relates to machines for, and methods of, forming spiral fins on tubes, and more particularly to a machine for, and method of, applying a smooth, spirally wound metal fin about a metal tube in such manner as to roll the fin curls to the size of the tube or slightly smaller so that the fin adheres to the tube surface.

A successful form of heat exchanger for conditioning air or other gases is a tube through which a heat exchange fluid is circulated, having a metal ribbon wound spirally on its exterior surface and serving as an extended heat exchange surface. Such ribbons on such tubes are usually referred to as "fins."

Prior methods of forming closely spaced fins spirally on tubes have involved either crimping the inner edge of a ribbon to cause it to curl around a tube, or forming the ribbon into a spiral before it is placed on a tube. Crimped fins are not suitable for some types of heat exchangers where smooth fins are preferred due to their lower resistance to gas flow. Pre-forming a spiral provides a smooth fin, but placing it satisfactorily on a tube for proper spacing and tension is troublesome.

This invention departs from prior practices by rolling a smooth ribbon or wire directly upon a tube so as to wind spirally thereon and form spaced fins when the tube is rotated and advanced. This is accomplished by deforming the ribbon so that its thickness is less at the outer edge than at its inner edge. If a wire be employed it is elongated and distorted in shape to form the fin. Deforming the ribbon in this manner causes an increase in the length of the outer edge of the ribbon thereby causing it to curl tightly around the tube.

In one embodiment of the invention, a ribbon is fed between two rolls, one having a plane backing-up surface, and the other having a beveled surface shaped to form the ribbon as it passes between the rolls. Preferably, the roll having the plane surface is a disk roll having an outer flange which extends between the fin being formed and the adjacent previously formed fin. The roll having the beveled surface preferably has such a small diameter compared to the disk roll, that the pressure it exerts rolling the ribbon is not sufficient to break the disk.

In prior fin winding machines, great difficulty was encountered in coordinating the formation of a ribbon into a spiral, and the advance and rotation of a tube upon which the ribbon was applied, resulting in improper spacing of the turns of the fin, and in irregularities in the tension of the ribbon.

A feature of this invention resides in providing means for advancing and rotating a tube upon which a ribbon is being wound, which is so coordinated with the tension of the ribbon as it is placed upon the tube, that such means slips continuously around the tube, its rate of slip increasing when the tension of the ribbon increases above normal, and its rate of slip decreasing when the tension on the ribbon decreases below normal; thus the proper tension is maintained at all times on the ribbon so that it cannot become loose on the tube, nor become too tight so as to break or become distorted.

As the fin passes from between the forming rolls, if very thin stock is used, it may have a wave formed therein which is undesirable where smooth fins are preferred. A straightening roll is provided for removing this wave embodiment of the invention, comprises one or more sets of spaced apart disks between which the fin is received as it leaves the forming rolls, some of the disks having escalloped surfaces which are so shaped and spaced, and which in number are sufficient when the disks are rotated at the proper speed, that the wave in the fin is completely ironed out, leaving a smooth fin. To aid in straightening and holding the fin erect, a plane surface on the back side of one of the straightening disks cooperates with the outer plane surface of an adjacent disk.

For some duties where high heat transfer from the fins to a gas is desired, the number of escalloped surfaces on the disks and their speed of rotation can be adjusted for providing crimps or waves in the fins instead of removing waves therein.

To facilitate the start of a fin winding operation, the straightening disk assembly is pivoted to the frame of the machine whereby it can be rotated to one side for providing access to the forming rolls.

An object of the invention is to provide an improved method of forming a metal fin spirally about a metal tube.

Another object of the invention is to provide an improved machine for forming a metal fin spirally about a metal tube.

Another object of the invention is to coordinate the advance and rotation of a tube upon which a ribbon is wound, with the tension of the ribbon.

The attached drawings illustrate a preferred embodiment of my invention, in which.

Figure 1:
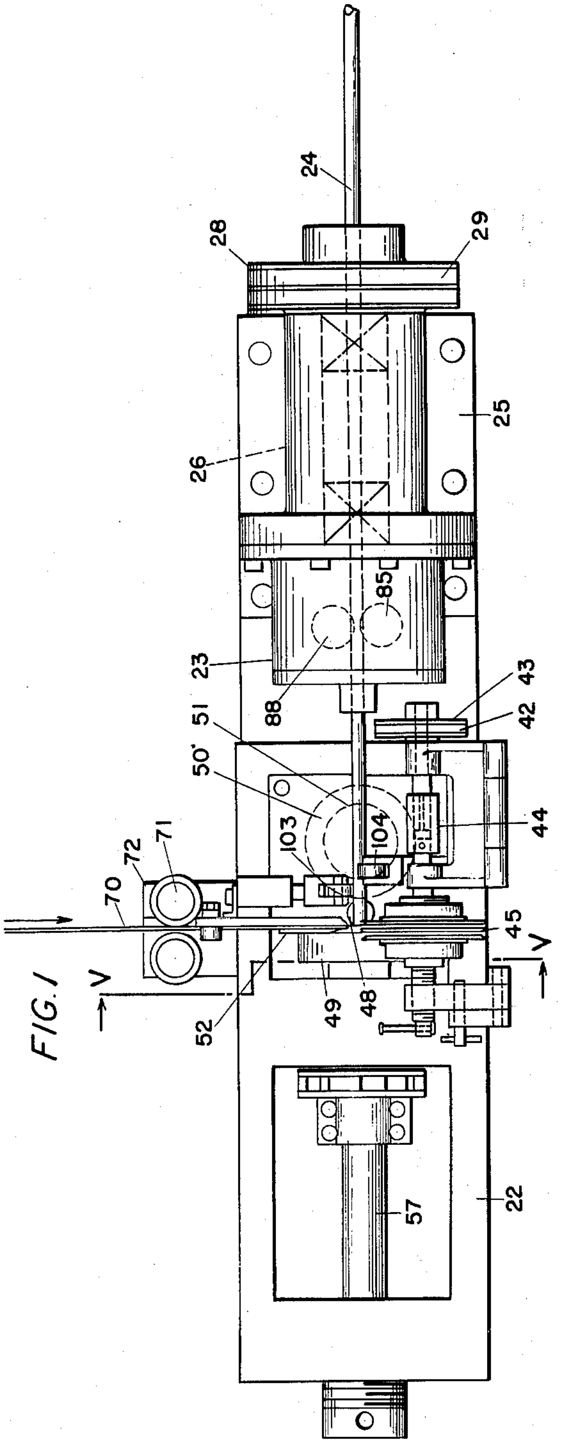
Figure 1 is a plan view of a fin winding machine embodying this invention.

Referring to the attached drawings, there is shown the fin forming machine of the present invention. Such machine includes uprights 20 which support a lower table 21 and an upper table 22. A head 23 for rotating and advancing a tube 24, on which a fin is to be applied, is bolted to an upstanding annular flange forming one end of the bearing housing 25 which is supported on an integral base shown bolted to table 22. Shaft 26 in head 23 has the head member 27 formed on its inner end (refer to Figure 13) and has pulley 28 attached to its outer end.

Pulley 28 is driven through belt 29 by pulley 30 on shaft 32. The geared-down electric motor 33, bolted to the underside of table 22, rotates shaft 32 through a pulley 31 attached thereto. Belting 34 connects pulley 31 and motor 33. Shaft 32 extends through a bearing 35 supported on table 21 and is connected through an overrunning clutch 36 with an aligned shaft 37 which extends through bearing 38 to coupling 39 which connects it to an aligned shaft 40 carrying pulley 41.

Belt 42 connects pulley 41 with pulley 43 which drives, through a slip joint 44, a straightening disk assembly indicated generally at 45 and described in detail hereinafter.

Shaft 40 extends into one side of gear box 46. Vertical shaft 47 extends from the upper end of gear box 46. Preferably, the upper end of shaft 47 is tapered inwardly at its upper end (refer to Figure 5) to provide a tapered roll 48 which cooperates with disk roll 49 to roll the outer edge of a ribbon so that it has less thickness at its tip than at its heel.

A backing roll 50 of greater diameter than forming roll 48 provides line contact with the upper end of shaft 47 adjacent the forming roll 48 thereon and provides backing-up support for the shaft during the finning operation. Roll 50 is held in fixed position axially of the machine by a pin 51 but is free to rotate about pin 51 by its contact with shaft 47. As stated above, roll 50 permits the application of the necessary pressure by roll 48 to the metal ribbon to roll in the ribbon about the tube to form a fin of desired contour.

Disk roll 49 terminates in a flange 52 adjacent the tapered roll 48. The end of disk roll 49 is plane and is in contact with the ribbon, as hereinafter described.

A shaft 53 aligned with shaft 40, extends from the opposite end of gear box 46 and has attached thereto a relatively small sprocket 54 which is connected by a chain 55 to a relatively large upper sprocket 56 mounted on shaft 57 which supports disk roll 49, thus rotating disk roll 49 at reduced speeds. It is desirable to rotate the disk roll 49 at start-up to aid in feeding ribbon into the nip formed between rolls 48 and 49.

Shaft 53 also has attached thereto a pulley 58 connected by belting 59 to a pulley 60 attached to the hydraulic clutch member 61 which cooperates with a similar clutch member 62, driven by electric motor 63. The motor 63 and clutch members 61 and 62 are contained in a housing 64 which has a partition 65 separating the motor and the clutch members for isolating the motor from the fluid in which the clutch members rotate.

The geared-down motor 33 is used for rotating the rotary mechanism described in the foregoing, at low speed, for starting up, and motor 63 is provided for driving the assembly at high speed after the start of the fin winding operation.

Figure 5:
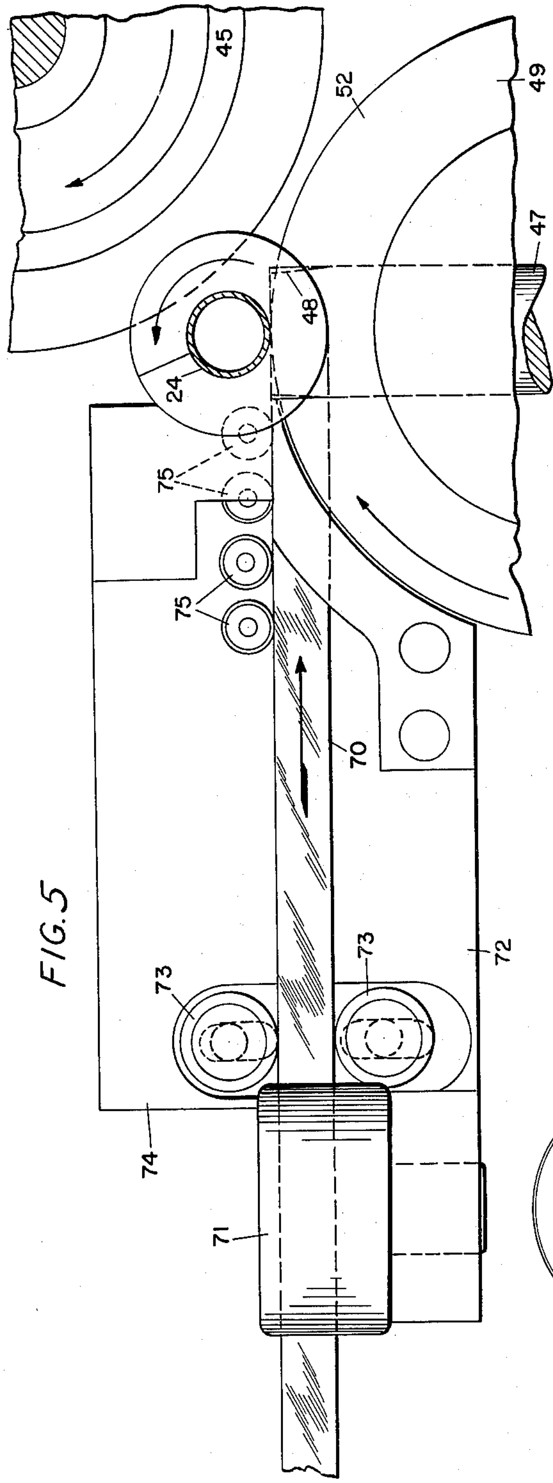
Figure 5 is an enlarged sectional view taken along the line V—V of Figure 1.
Figure 6:
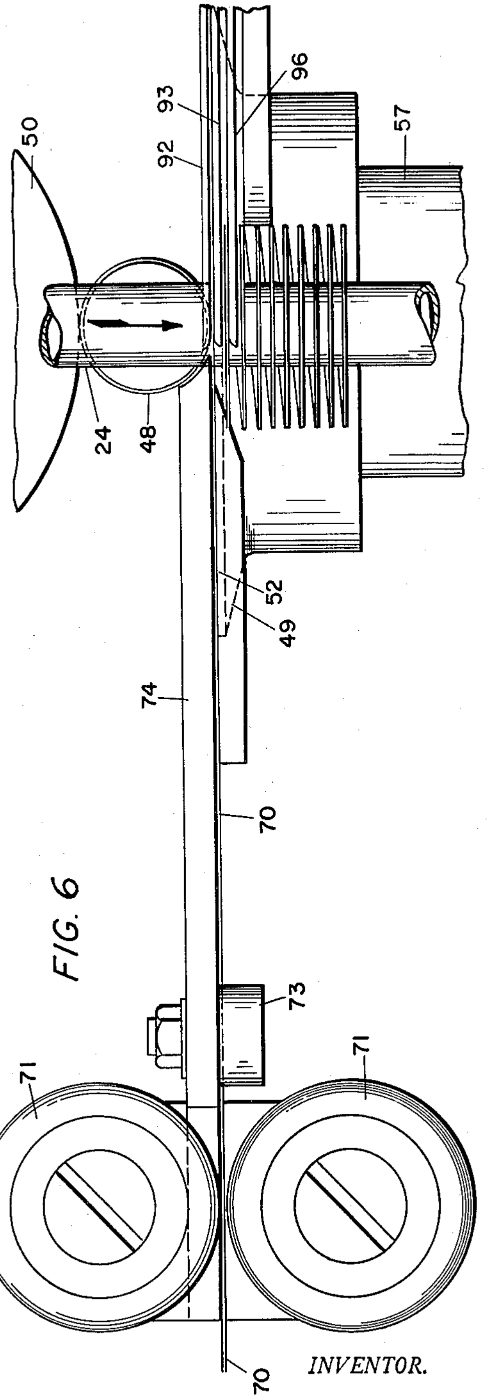
Figure 6 is a plan view of the portion of the machine shown in Figure 5.
Figure 7:
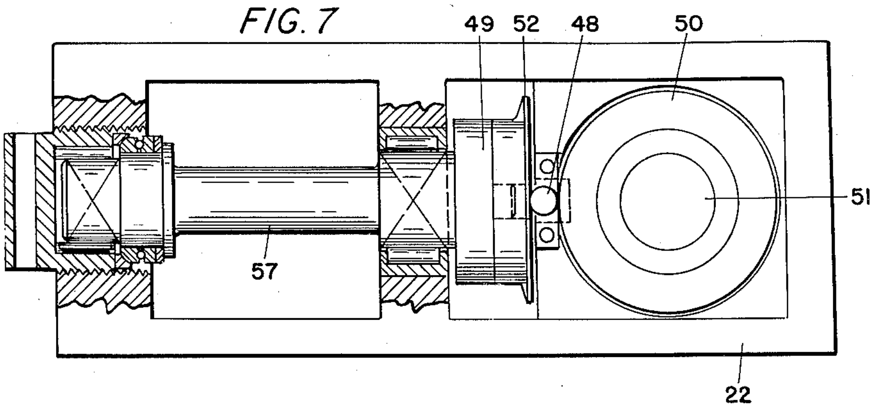
Figure 7 is an enlarged view, partly in plan and partly in section, of the left hand end of the machine shown in Figure 1, having the straightening disk assembly omitted.
Figure 8:
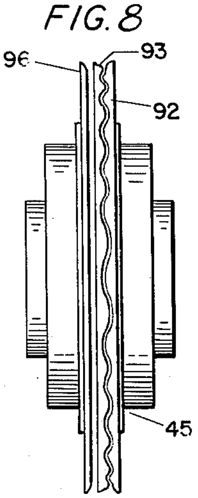
Figure 8 is an enlarged front elevation of the straightening assembly.
Figure 9:
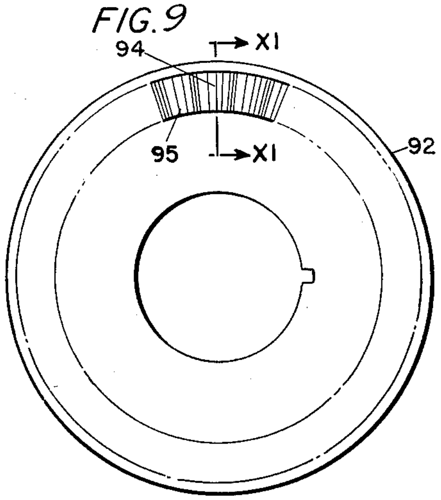
Figure 9 is a view in elevation illustrating the escalloped surface of one of the straightening disks.
Figure 11:
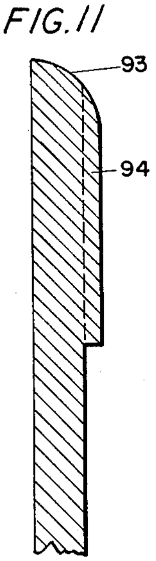
Figure 11 is an enlarged fractional sectional view of one of the straightening disks taken on the line XI—XI of Figure 9.
Figure 10:
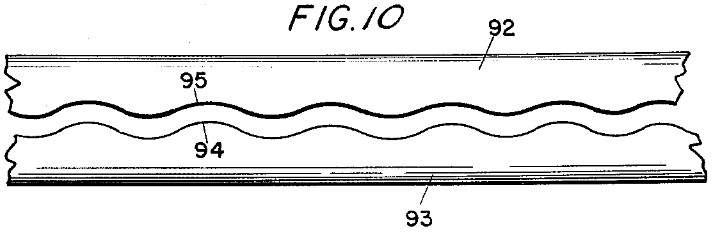
Figure 10 is an enlarged fractional plan view of the straightening disks.

In Figures 1, 5 and 6 of the drawings there is shown a ribbon 70 which is fed between roller bearings 71 supported by a horizontal guide plate 72. The upper and lower edges of ribbon 70 are in contact with rollers 73 which are journalled in the vertical guide plate 74. The ribbon 70 then passes under rolls 75 journalled in plate 74, adjacent vertical guide 75', and passes between the forming roll 48 and disk roll 49, as illustrated also by Figure 15. It will be understood one or more of rolls 75 may be employed to guide the ribbon into the nip of rolls 48 and 49.

Figures 12, 13, 14:
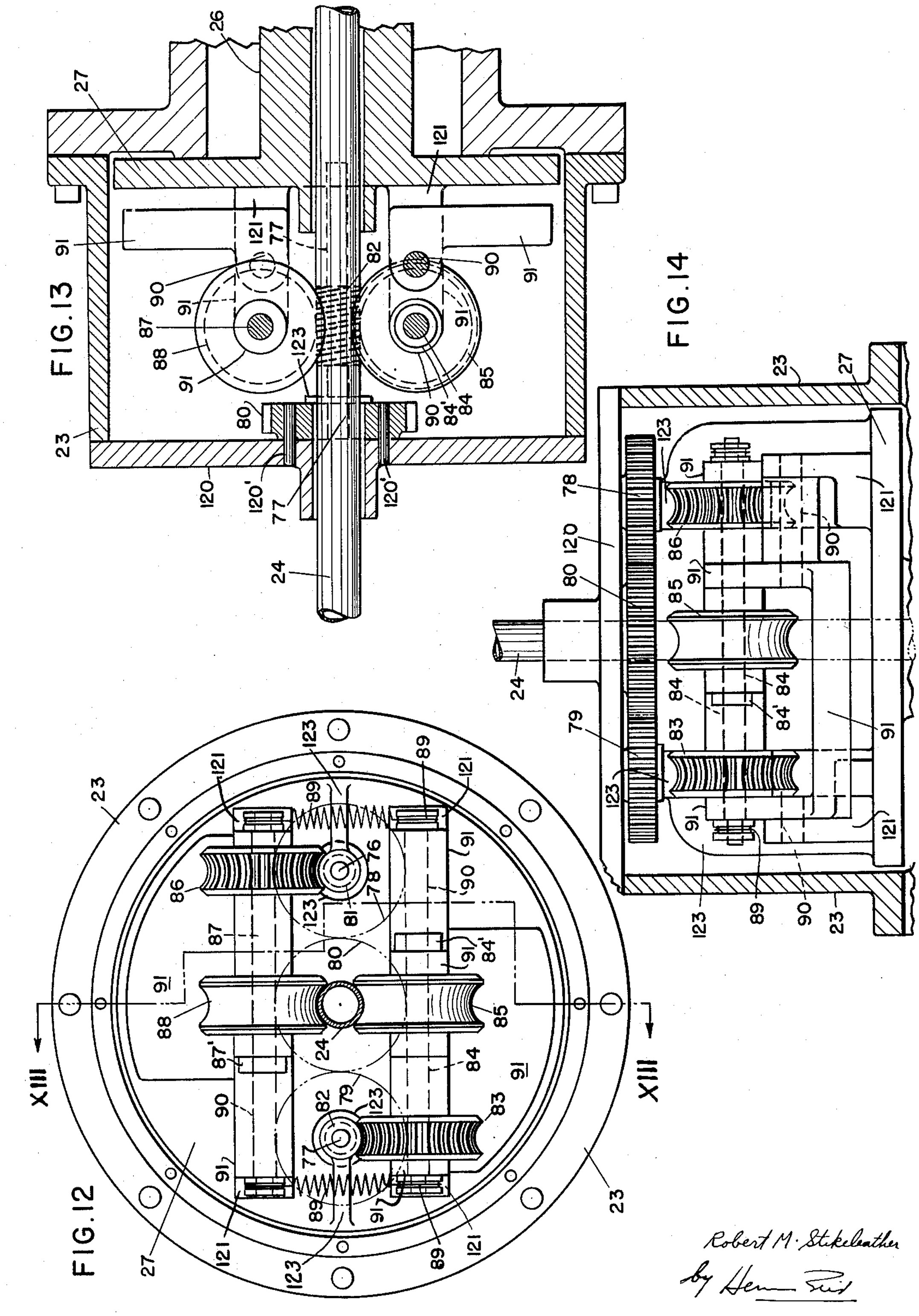
Figure 12 is an enlarged end view, with the end plate removed, of the assembly for rotating and advancing a tube upon which a ribbon is to be wound.
Figure 13 is a sectional view taken along the line XIII—XIII of Figure 12.
Figure 14 is a plan view of the head assembly shown in Figure 12, having the upper portion of the housing of the assembly removed.

The means for rotating and advancing the tube 24 on which a fin is to be formed will now be described with reference to Figures 12, 13 and 14 of the drawings. The head member 27 on the inner end of the shaft 26 has attached thereto the supports 123 in the inner ends of which are journalled the inner ends of the shafts 76 and 77, the outer ends of which are journalled in the head member 27. On the inner ends of the shafts 76 and 77 are attached the gears 78 and 79 respectively, which intermesh with the inner gear 80 which is held against rotation with respect to the cover plate 120 by the pins 120'. The shafts 76 and 77 have attached thereto between their ends, the worm gears 81 and 82 respectively.

The two, oppositely positioned counter-weights 91 have the shafts 84 and 87 journalled for rotation therein adjacent their inner ends. The counter-weights are pivoted for rotation about the two pivot shafts 90 which extend through the two oppositely positioned supports 121 which are secured at their outer ends to the face plate 27.

The gear 83 meshing with the worm gear 82 is attached to the shaft 84 adjacent one end thereof, the tube feed roll 85 being attached to the shaft 84 adjacent the other end thereof. The collar 84' is attached to the end of the shaft 84 adjacent the roll 85. The gear 86 meshing with the worm gear 81 is attached to the shaft 87 adjacent one end thereof, the tube feed roll 88 being attached to the shaft 87 adjacent the other end thereof. The collar 87' is attached to the end of the shaft 87 adjacent the roll 88.

The ends of the counter-weights 91 are interconnected by the coiled springs 89 which pull the rolls 85 and 88 towards each other in frictional contact with the tube 24. The feed rolls 85 and 88 have surfaces curved to fit the exterior surface of the tube 24.

The pivoted counter-weights 91 oppose the action of centrifugal force in tending to cause the rolls 85 and 86 and the gears 83 and 86 to move outwardly. This may be understood by reference to Figure 13 where it will be seen that centrifugal force will cause the larger, vertically extending portions of the counter-weights to tend to move outwardly and to rotate about the pivots 90 towards the rolls 85 and 88, thus tending to cause the rolls 85 and 88 and the gears 83 and 86 to move inwardly in opposition to the action of centrifugal force acting on such rolls and gears. The pivoted counter-weights permit the advancing and turning rolls 85 and 86 to move inwardly or outwardly against the tension of the springs 89 as the tube 24 varies in size.

In the operation of the tube rotating and advancing mechanism the rotation of shaft 26, as described above, causes rotation of the head member 27. The gears 78 and 79 carried by shafts 76 and 77 are caused to rotate through being meshed with the fixed gear 80 attached to the head 23. Ths causes rotation of shafts 76 and 77 and rotation of the worms 81 and 82. Rotation of the worms 81 and 82 rotates worm gears 83 and 86 which rotate the shafts 84 and 87 respectively. Tube feed rolls 85 and 88, mounted on shafts 84 and 86 are rotated in a direction to advance the tube 24 toward the fin forming rolls, to the left considering Figure 13 of the drawing. At the same time, since the head member 27 is rotated, the rolls 85 and 88 are rotated bodily about the axis of the tube 24 causing the tube to rotate.

Springs 89 are tensioned so that under operating conditions the friction between the rolls 85 and 88 is sufficient to cause about 10% slippage between the tubes and the rolls 85 and 88 under normal ribbon tension. If the ribbon tension increases above normal the tube will be held back a corresponding amount through its connection thereto so that increased slippage will occur. If the ribbon tension decreases below normal its pull on the tube will decrease a corresponding amount so that decreased slippage will occur. It will be appreciated that the amount of slippage is empirically determined; slippage within a wide range may occur. I have found that as much as 50% slippage may occur, if desired.

Figure 15:
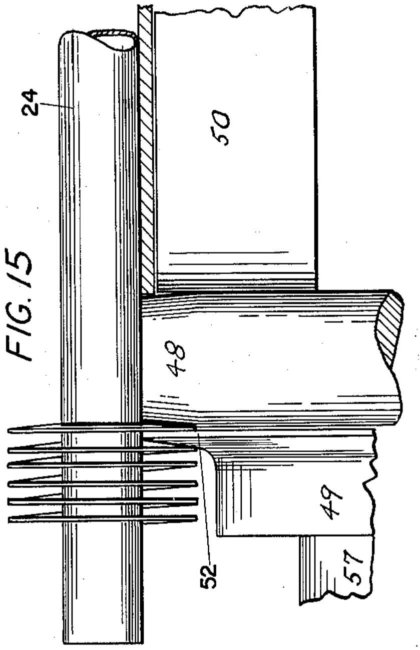
Figure 15 is a fragmentary view, partly in section and partly in elevation, of the forming rolls and of several turns of a spiral fin formed thereby on a tube.

As the tube 24 is rotated and advanced as described, and the ribbon 70 is fed between the rolls 48 and 49 as described, the outer edge of the ribbon is squeezed between the rolls so that its width is less than the width of the inner edge. This causes the ribbon to curl around the tube so that its inner edge or heel grips the tube tightly, forming a spiral fin thereon, as illustrated by Figures 5, 6, and 15 of the drawings. The flange 52 of roll 49 passes between adjacent turns of the fin as it is formed and supports and aids in spacing the fins. It will be appreciated the thickness of the flange of roll 49 is material in my invention. Such thickness, preferably, is in the order of the desired spacing between fins, or may be smaller. It will be appreciated such thickness may be slightly greater than the spacing between adjacent fins, provided such thickness is not so great as to loosen the fin upon the tube. Any slight distortion of the fin caused by such thickness will be eliminated by passage through the straightening device 45, as hereinafter described.

It will be appreciated that rotation of rolls 48 and 49 draws the ribbon from supply and rolls it in about tube 24, frictionally securing the ribbon to the tube without substantial deformation at the heel and elongating the tip longitudinally of the ribbon to wind or curl the ribbon about the tube spirally to form the fin. The pressure exerted by the small forming roll 48 in rolling and forming the fin against the disk roll 49 is taken by backing roll 50. In other words, roll 48 in itself need not exert the pressure required to shape and wrap the ribbon so that it may be small enough to roll the ribbon and not exert a pressure in excess of the strength of the disk.

As the fin passes from between rolls 48 and 49, it may have a wave therein which for some duties would be undesirable so that the straightening disk assembly 45 is provided for removing this wave. Assembly 45 (refer to Figures 8, 9, 10 and 11) comprises a pair of closely spaced disks 92 and 93 having escalloped inner surfaces, ridges 94 on one disk facing recesses 95 on the other disk. The ridges and recesses are so arranged in shape, number and spacing, and are rotated at such speed that they iron out the waves in the ribbon leaving it perfectly smooth.

Disk 96 has a plane surface facing the back plane surface of disk 93, the spacing being such that the distance between such plane surfaces is equal to the proper distance between turns of the fin on the tube. The disks 93 and 96 aid in straightening the fins and in maintaining them in an erect position.

It is necessary that the straightening disk assembly 45 be located closely adjacent the forming rolls during the fin operation to space the assembly from the forming rolls for enabling the ribbon to be fed therebetween at the start of a fin forming operation. The assembly is pivoted at 97 to the machine, and has a removable pin 98 which when withdrawn from the opening 99 in the link 100 permits the assembly to be rotated from the fin straightening position, illustrated by Figure 4 of the drawing. The idler pulley 101 tensioned by the spring 102 maintains the proper tension in the belt 42 which rotates the assembly, for preventing it from slipping from its pulleys 41 and 43.

Figure 3:
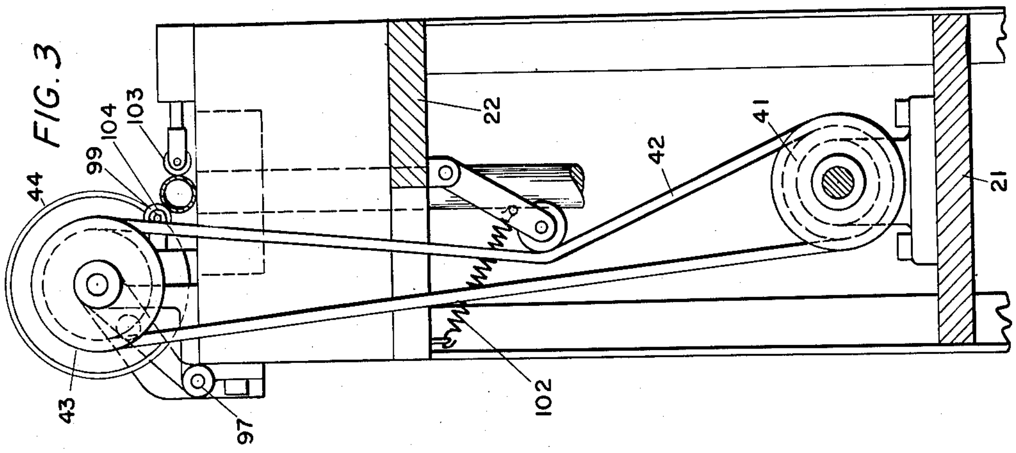
Figure 3 is a sectional view taken along the line III—III of Figure 2, and illustrates the straightening disk assembly in working position.

Rolls 103 and 104 may be provided and supported by table 22 to contact opposite sides of tube 24 (refer to Figures 3 and 4) adjacent the forming rolls for maintaining the tube properly in position as the fin is applied.

Figure 4:
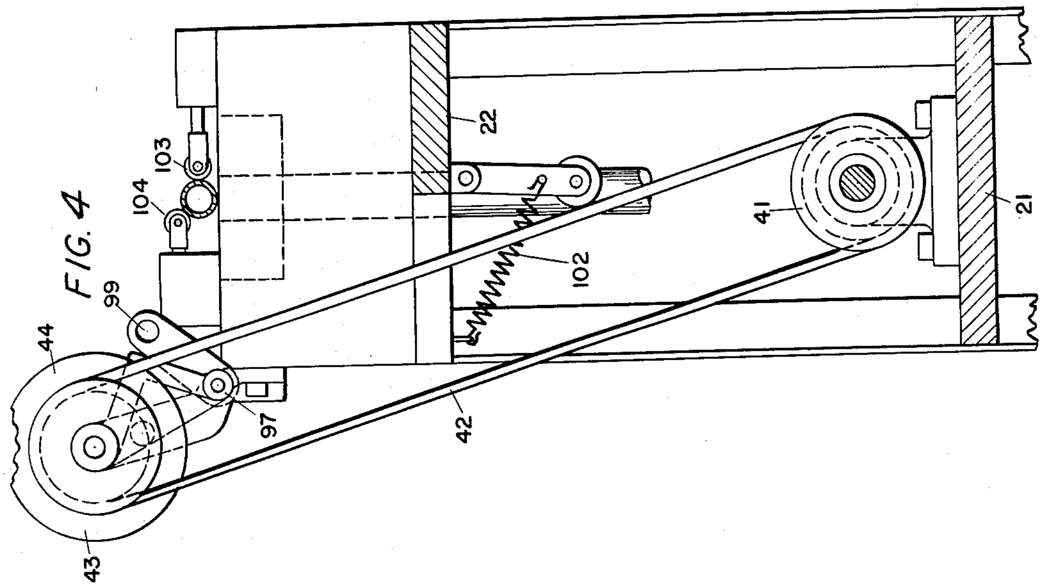
Figure 4 is a sectional view similar to Figure 3 having the straightening disk assembly rotated to one side to provide access to the forming rolls.

At the start of a fin winding operation, the straightening disk assembly 45 is pivoted out of position, as shown in Figure 4; after the advancing end of a ribbon has been placed by hand at the ribbon entering edges of the forming rolls, the motor 33 is started. This rotates the tube advancing and rotating mechanism and the forming rolls at slow speed for enabling any necessary adjustment to be made. At this time motor 63 is not energized. When a few turns of the fin have been properly formed, the straightening disk mechanism is rotated to its operating position (refer to Figure 3) and the motor 63 is started. It starts at high speed and for preventing any sudden strain on the fin forming mechanism, the fluid clutch comprising driving members 58 and 59 is provided. Since the clutch 36 is overrunning, the motor 33 provides no drag at this time and may be shut down.

Figures 16, 18, 19:
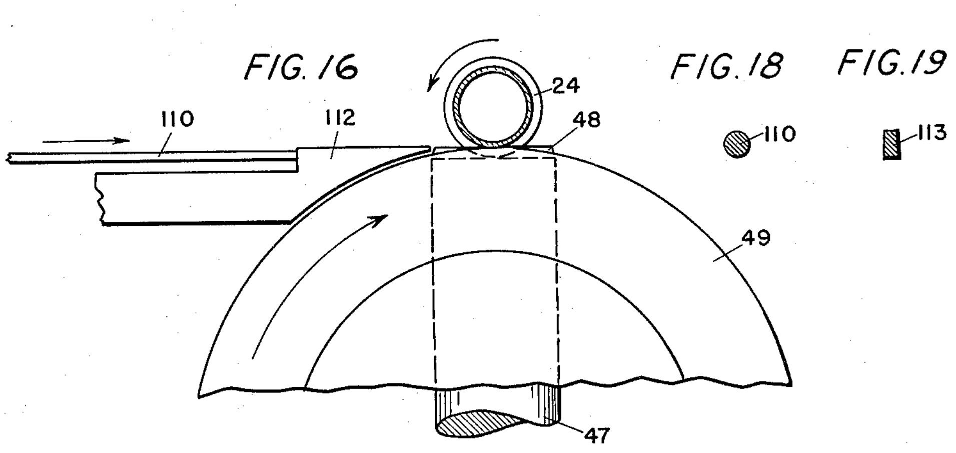
Figure 16 is a fragmentary view, partly in elevation and partly in section, of a modification of the machine for flattening wire and for winding the flattened wire on a tube.
Figure 18 is an enlarged sectional view of the wire employed in the machine shown in Figure 16.
Figure 19 is a sectional view of the wire fin formed by the machine shown in Figure 16.
Figure 17:
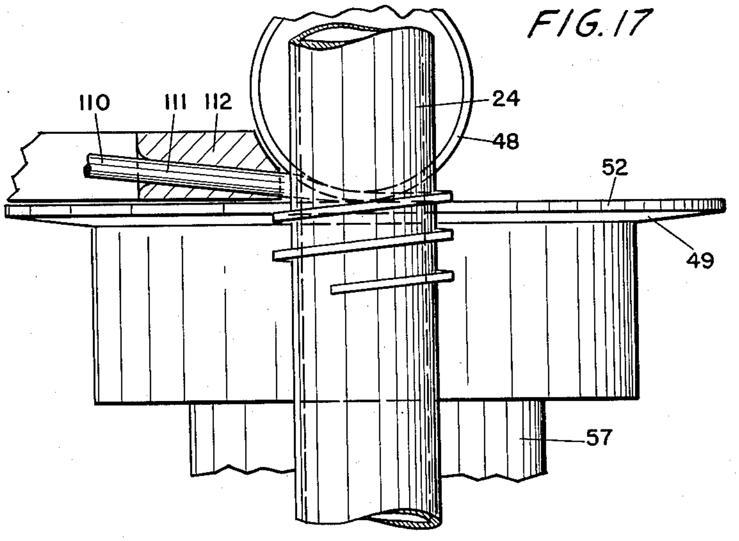
Figure 17 is a plan view of the machine shown in Figure 16.
Figure 20:
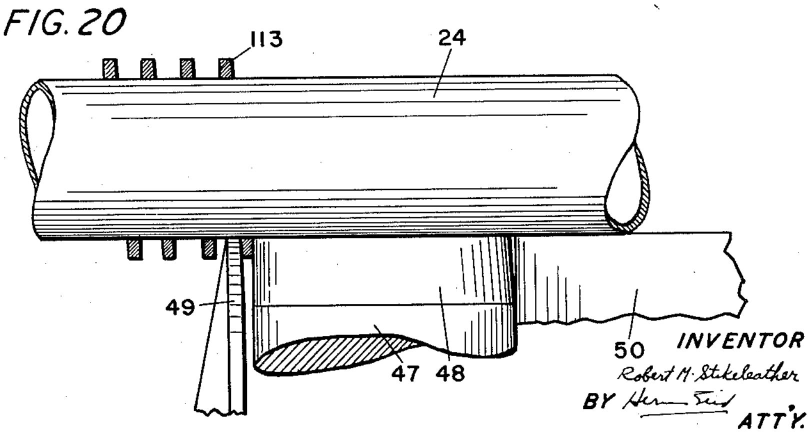
Figure 20 is an enlarged view, partly in section and partly in elevation showing several fins formed from wire, wound on a tube.

As shown in Figures 16 to 20 inclusive, this invention may also be used for flattening wire and for winding the flattened wire on a tube for forming low fins. Figures 16 and 17 illustrate the manner in which the machine previously described may be modified for this purpose. Considering Figures 16 and 17, shaft 47 terminating in tapered roll 48 cooperates with disk roll 49, as previously described. Preferably, when wire is formed into fins the taper on roll 48 is not so great as when ribbon is rolled into a fin on tube 24. The wire 110 is supplied to the nip formed by rolls 48 and 49 through an orifice 111 in a guide 112. Passage of the wire between the rolls 48 and 49 elongates the wire about 50% in length and distorts the wire to the shape of a fin 113, shown in Figure 19. It will be appreciated, in other details the machine is the same as described previously. When wire is elongated and distorted into a fin wrapped about the tube it is not necessary to employ the straightener assembly 45.

It may be desired to employ the machine of the present invention to form a fin with a crimp or other indentation in the tip rather than to form a smooth fin. In such circumstances the straightener assembly 45 may be omitted or operated at the same peripheral speed as the fin so that the escallops will form crimps in the outer edge of the fin. Any suitable device may be substituted for the straightening disk to form the desired contour.

Figure 2:
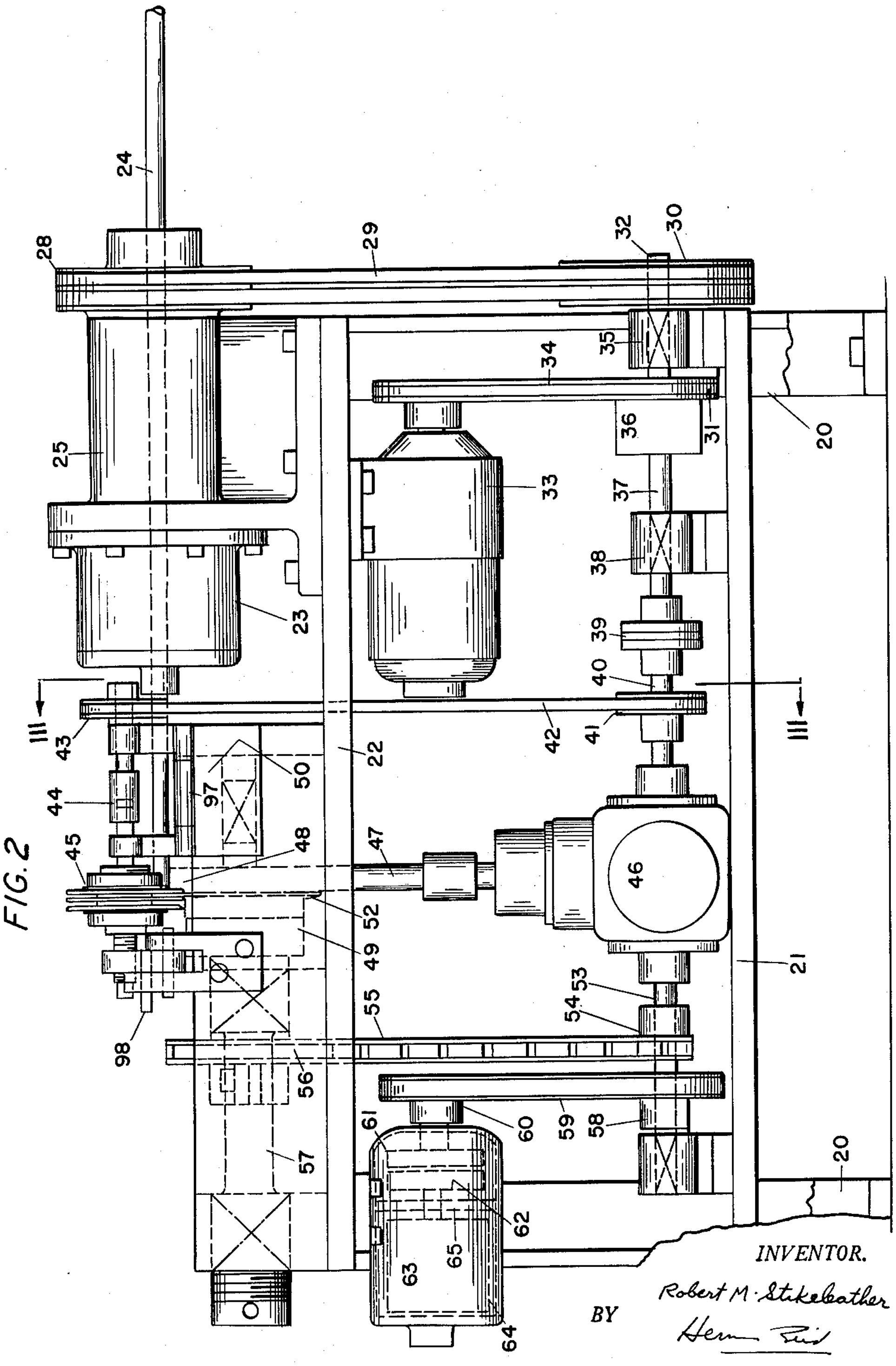
Figure 2 is a view in front elevation of the machine shown in Figure 1.

It will be appreciated, as shown in Figures 1 and 2, the straightening assembly 45 is adjustable axially, by means of threaded shaft 124, of the tube 24 as well as being rotatable toward and from tube 24. Under some circumstances, it may be possible to operate the machine satisfactorily without employing the straightening assembly 45. This is generally undesirable, however, since very delicate adjustment of the machine is required. For commercial operation it is generally preferable to employ the straightening assembly.

If desired, the metal ribbon 70 may be lubricated prior to its supply to the forming roll. In most cases, however, such lubrication is not necessary. While the fin is frictionally secured to the tube, under some circumstances, it may be desirable to solder the fin to the tube. In such case, any suitable soldering arrangement may be employed.

The present invention provides a speedy, economical device for forming a smooth surface fin about a metal tube. Preferably, in most cases, a separate head is provided for each diameter of tube to be provided with extended heat exchange surface since the expense of such heads is not great.

The present machine permits a fin having any desired thickness to be formed on a tube, even a tip thickness as low as three thousandths of an inch. Commercially, the finned tube may have a tipped thickness of four or five thousandths of an inch. By so forming the tip of the fin, large amounts of material can be saved in the outer edge of the fin; the possible saving may be 20% or more of the cost of material required to form the fin. A particular advantage of the present machine resides in the fact that it may be employed to form the usual finning from ribbon, or if desired may be employed to elongate and distort wire into a low fin wrapped about the tube and frictionally secured thereto.

While I have described a preferred embodiment of my invention it will be understood my invention is not limited thereto since it may be otherwise embodied within the scope of the following claims.

I claim:

1. In combination with a machine for rotating and advancing a spirally finned tube, a straightening device for ironing out irregularities in the peripheral portion of the fin, said device comprising first and second discs for receiving and gripping a first convolution of a fin on the tube between their adjacent surfaces, a third disc, said second and third discs having adjacent surfaces for receiving and gripping the next adjacent convolution of the fin on the tube, at least a pair of said adjacent surfaces being escalloped with ridges on one adjacent escalloped surface being opposite depressions in another adjacent escalloped surface, means for supporting said discs for rotation about a common axis, and means for rotating said discs about said axis for straightening said peripheral portion of the fin.

2. In combination with a machine for rotating and advancing a spirally finned tube, a device for straightening the shape of the peripheral portion of the fin, said device comprising a pair of discs having adjacent escalloped surfaces for receiving and gripping a convolution of the fin, ridges on one of said surfaces being opposite depressions in the other of said surfaces, means for supporting said discs for rotation about a common axis and spaced from the tube axis, and means for rotating the discs.

3. In combination with a machine for rotating and advancing a spirally finned tube, a straightening device for ironing out irregularities in the peripheral portion of the fin, said device comprising first and second discs for receiving and gripping a first convolution of a fin on the tube between their adjacent surfaces, one of said surfaces having a plurality of radially extending ridges thereon, the other of said surfaces having a plurality of radially extending depressions therein opposite said ridges, a third disc, said second and third discs having adjacent surfaces for receivng and gripping the next adjacent convolution of the fin on the tube, means for supporting said discs for rotation about a common axis, means for rotating said discs about said axis for straightening said peripheral portion of the fin, and means for adjusting the discs along their common axis.

4. In combination with a machine for rotating and advancing a spirally finned tube, a device for straightening the shape of the peripheral portion of the fin, said device comprising a pair of discs having adjacent escalloped surfaces for receiving and gripping a convolution of the fin, ridges on one of said surfaces being opposite depressions in the other of said surfaces, a third disc, one of said pair of discs and said third disc having adjacent plain surfaces for receiving and gripping the next adjacent convolution of the fin on the tube, means for supporting said discs for rotation about a common axis, and spaced from the tube axis, and means for rotating the discs.

5. The invention claimed in claim 2 in which means are provided for adjusting the discs along their common axis.

6. The invention claimed in claim 2 in which means are provided to move the straightening device toward and from the tube.

7. The invention claimed in claim 6 in which means are provided for adjusting the discs along their common axis.

References Cited in the file of this patent

UNITED STATES PATENTS

| | | |
|---|---|---|
| 760,448 | Gustavsen | May 24, 1904 |
| 1,472,719 | Horvath | Oct. 30, 1923 |
| 1,623,766 | Way | Apr. 5, 1927 |
| 1,629,759 | Wise | May 24, 1927 |
| 1,840,317 | Horvath | Jan. 12, 1932 |
| 1,850,886 | Lane | Mar. 22, 1932 |
| 1,850,936 | Lane | Mar. 22, 1932 |
| 1,884,203 | Pickhard | Oct. 25, 1932 |
| 1,896,350 | Bundy | Feb. 7, 1933 |
| 1,950,623 | Owston | Mar. 13, 1934 |
| 1,997,197 | Nigro | Apr. 9, 1935 |
| 2,152,437 | Lear | Mar. 28, 1939 |
| 2,160,497 | Garrett | May 30, 1939 |
| 2,374,144 | Stikeleather | Apr. 17, 1945 |
| 2,408,322 | Lear | Sept. 24, 1946 |
| 2,429,201 | Conner | Oct. 21, 1947 |
| 2,498,813 | Lea | Feb. 28, 1950 |
| 2,508,518 | Hill | May 23, 1950 |
| 2,532,239 | Newlin | Nov. 28, 1950 |
| 2,538,950 | Schryber | Jan. 23, 1951 |

FOREIGN PATENTS

| | | |
|---|---|---|
| 5,006 | Great Britain | Feb. 27, 1902 |
| 519,798 | Great Britain | Apr. 5, 1940 |